Figure 1:
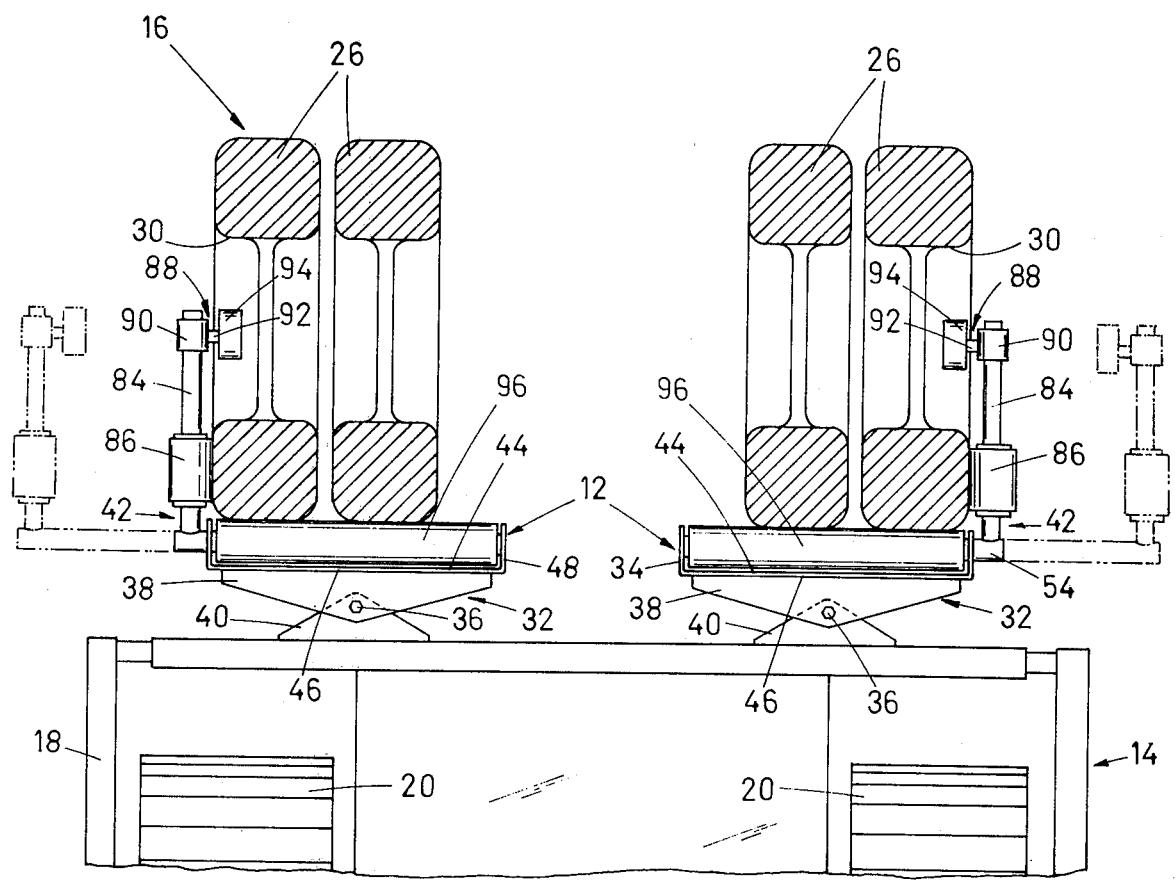

United States Patent [19]

Hoffman

[11] 3,990,721
[45] Nov. 9, 1976

[54] TRUCK HITCH

[75] Inventor: Richard C. Hoffman, Agincourt, Canada

[73] Assignee: Allatt Limited, Downsview, Canada

[22] Filed: May 27, 1975

[21] Appl. No.: 580,750

[52] U.S. Cl. .............................. 280/481; 180/14 R; 214/43; 280/460 R; 404/101
[51] Int. Cl.² ...................... B60D 3/00; E01C 19/12
[58] Field of Search .............. 180/14 C, 14 A, 14 R, 180/14 B, 1 C, 74; 214/43; 404/108, 101; 280/460 R, 503, 481

[56] References Cited
UNITED STATES PATENTS

| | | | |
|---|---|---|---|
| 3,138,392 | 6/1964 | Holland | 280/460 R |
| 3,279,824 | 10/1966 | Brisbin | 404/110 X |
| 3,304,101 | 2/1967 | Layton | 280/460 R |
| 3,515,411 | 6/1970 | Layton | 280/460 R |
| 3,542,397 | 11/1970 | Files | 280/460 R |

Primary Examiner—M. H. Wood, Jr.

[57] ABSTRACT

Apparatus for effecting a driving connection between a pushing vehicle and a pushed vehicle. The apparatus has pushers attachable to and providing a bumper formation on the leading end of the pushing vehicle for pushing engagement with the wheels of the other vehicle. Each pusher includes a frame pivotally attachable to the leading end of the pushing vehicle for left and right swinging thereon about a vertical axis independently of the frame of the other pusher, and a coupler slidably carried by the frame for reciprocable sliding movement in a substantially horizontal direction transversely of the pushing vehicle. An arm forming part of the coupler has a free end normally extending forwardly of the frame, and a lateral projection on the free end extends transversely of the pusher vehicle and is spaced from the frame to enable the lateral projection to be positioned, by sliding movement of the coupler within a wheel rim chamber of the other vehicle for transmission of a pulling force from the other vehicle to the pushing vehicle. Means are provided for laterally moving the coupler into and out of the wheel rim chamber.

7 Claims, 7 Drawing Figures

TRUCK HITCH

This invention concerns apparatus for effecting a driving connection between a pushing vehicle and another vehicle having broad overhanging wheel rims.

Such apparatus is required, for example, for use with paving machines which lay paving material on roads, driveways or other surfaces. Certain kinds of paving machines have their own source of propulsion and, during operation, receive a supply of paving material from a truck in front of the paving machine. The paving machine carries apparatus for connecting it to the truck, while the paving machine is pushing the rear wheels of the truck during a paving operation; the connecting apparatus serving to maintaining the correct relationship between the paving machine and the truck for ensuring that the paving material falls from the truck into the hopper of on the paving machine.

Since the truck may sometimes move faster than the paving machine, the connecting apparatus includes coupler arms engageable in an overlapping manner with the wheel rims of the truck so that a pulling force can be transmitted from the truck to the paving machine. The coupler arms are movable laterally inwardly and outwardly into or out of overlapping relation with the wheel rims of the truck, so that the apparatus can be connected with or released from the truck.

Obviously the coupler arms are proportioned to afford some separation between the vehicles while maintaining effective dumping relation even while the truck is actually pulling the paving machine instead of being pushed thereby.

In practice, the surface to be paved may not be straight, and hence, it is necessary that the connecting apparatus be capable of accommodating articulation between the pushing vehicle and the other vehicle, for example, when negotiating a curve on the surface being paved. Known connecting apparatus is somewhat limited in that it, and does not always adapt itself to the relatively sharp curves which are sometimes encountered.

That is to say, the pushing facilities in much of the prior art were provided on a single beam which was centrally pivoted at the front of the pushing vehicle and was elongated to engage both rear wheels of the pushed vehicle.

Because of its length, however, such beam had only limited pivotal scope with corresponding restriction on the potential articulation available between the two vehicles. Conversely, the invention provides an independent pusher for each rear wheel of the pushed vehicle, with each pusher being independently pivotally attached closely to the pushing vehicle. Serving only one wheel, each pusher is shortened substantially and hence capable of greater pivotability with consequently greater articulation without excessive extension forwardly of the pushing vehicle.

It is therefore an object of the invention to provide connecting apparatus of this kind which has improved capability, compared to known connecting apparatus, to accommodate articulation between the pushing vehicle and the pushed vehicle when the vehicles are travelling along a curved or like tortuous path.

According to the invention, the connecting apparatus has pushers attachable to and providing a bumper formation on the leading end of the pushing vehicle for pushing engagement with the wheels of the other vehicle. Each pusher includes a frame pivotally attachable to the leading end of the pushing vehicle for left and right swinging thereon about a vertical axis independently of the frame of the other pusher.

A coupler with a forwardly extending arm with a free end is slidably carried by each frame for sliding movement in a substantially horizontal direction transversely of the pushing vehicle. A lateral projection on the free end of the coupler extends transversely of the pushing vehicle and is spaced from the frame for enabling positioning of the lateral projection, by sliding movement of the coupler, in overlapping relation with a wheel rim of the other vehicle for tranmission of a pulling force from the other vehicle to the pushing vehicle. Means are also provided for effecting the sliding movement of the coupler for positioning the lateral projection in abutting relation with the inner wheel rim surface of a pushed vehicle and for withdrawing the lateral projection from overlapping relation.

Thus, each frame can swing about its vertical axis independently of the other frame, when the vehicles are travelling along a curved path and, accordingly, each frame can have a range of movement about its vertical axis which can accommodate relatively large angles of articulation between the pushing vehicle and the other vehicle.

The frame of each pusher may have a pair of spaced, parallel, transversely-elongated recesses, with the coupler including a corresponding pair of spaced, parallel bars slidably mounted in the recesses and connected for movement in unison. The coupler arm of each pusher may extend from one of the bars. Also each coupler arm may be angularly moveable about the longitudinal axis of the bar between operative and inoperative positions.

The frame of each pusher may also include a transversely extending sleeve whose interior forms one of the recesses, with a roller engageable with the other vehicle for transmitting a pushing force thereto being rotatably mounted on the sleeve.

The means for effecting the sliding movement of the coupler may include a fluid-pressure-operated, piston-cylinder, jack connected between the frame and the coupler. Means may also be provided for making a fluid coupling between the jack of one pusher and the jack of the other pusher, during the paving operation, whereby sliding movement of the coupler arm of one pusher is induced by corresponding sliding movement of the coupler arm of the other pusher in the same direction.

Figure 2:
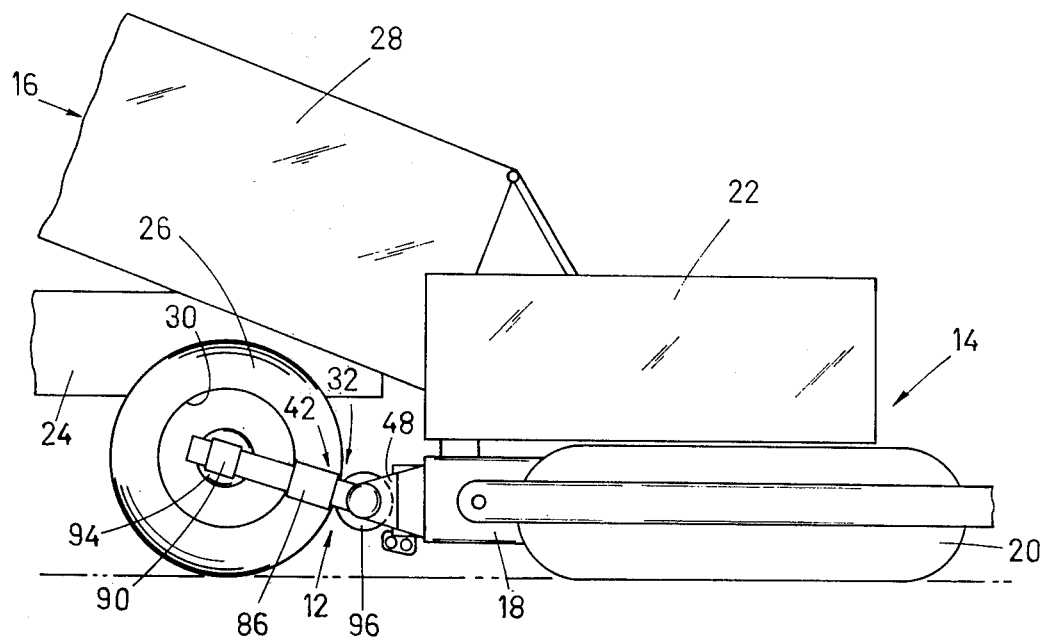
Figure 3:
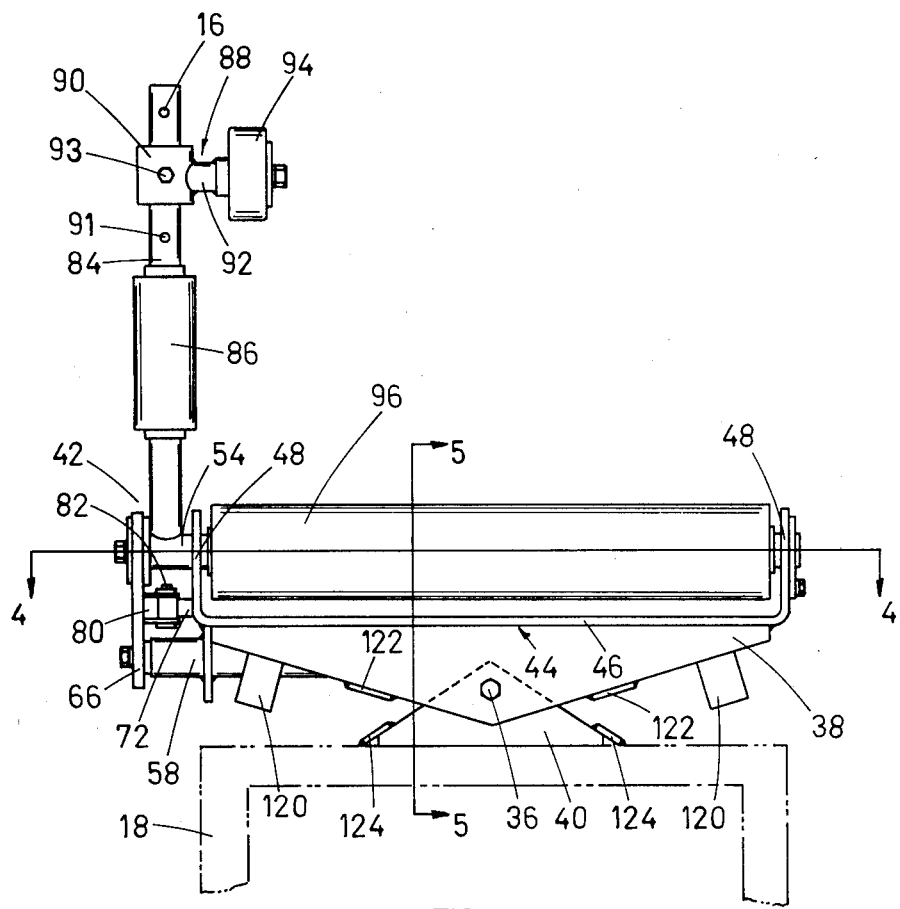
Figure 4:
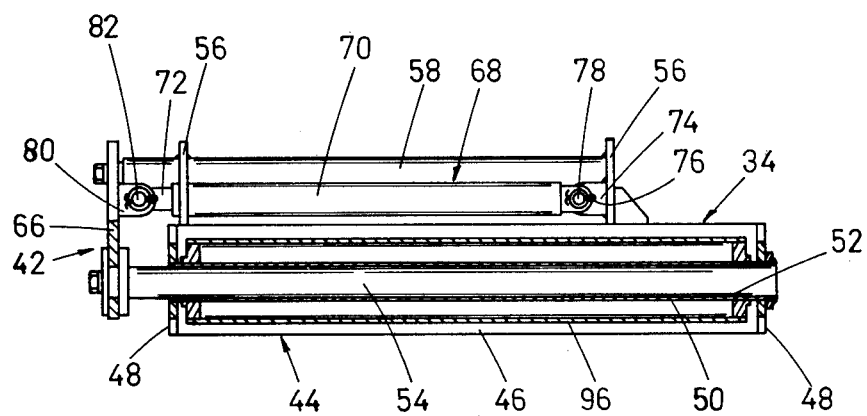
Figure 5:
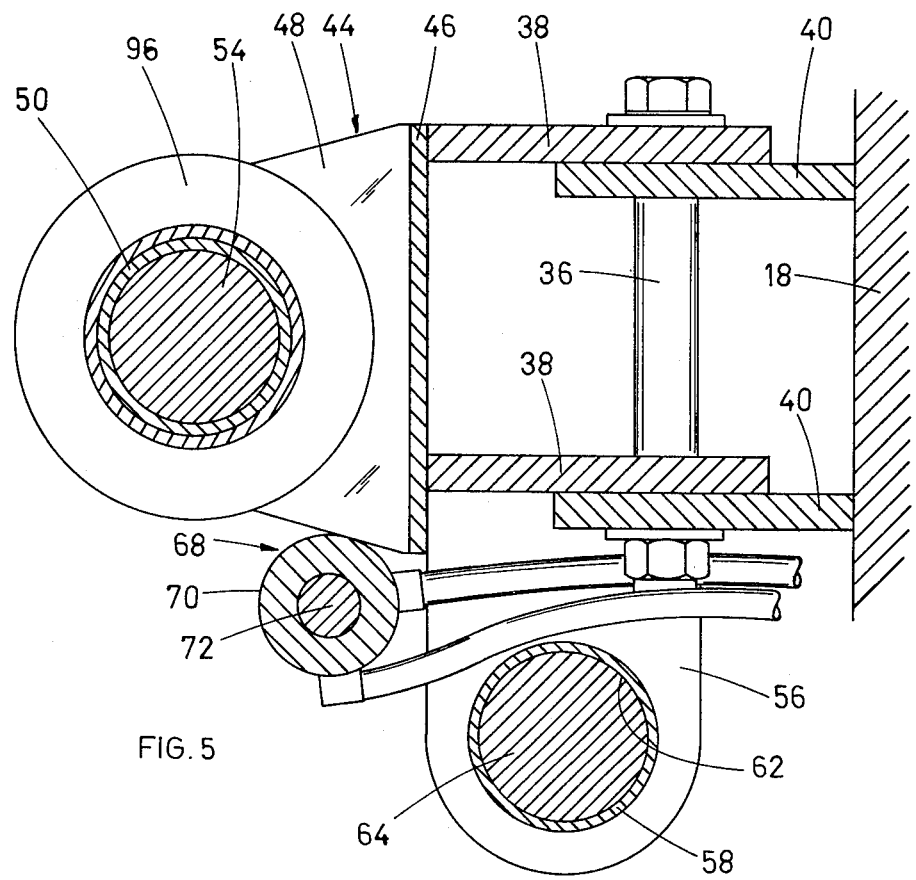
Figure 6:
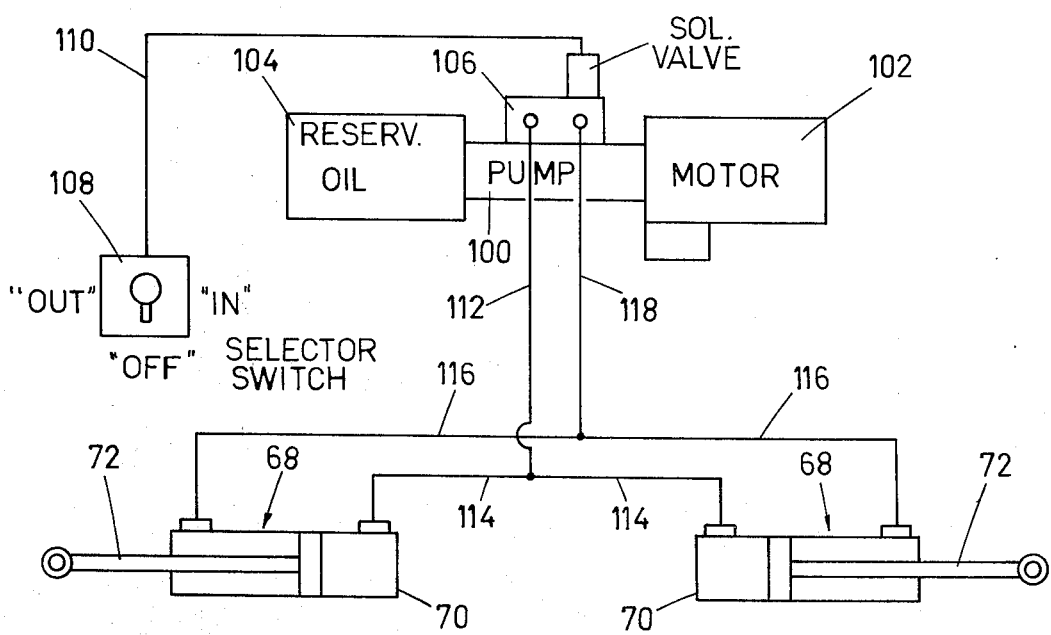
Figure 7:
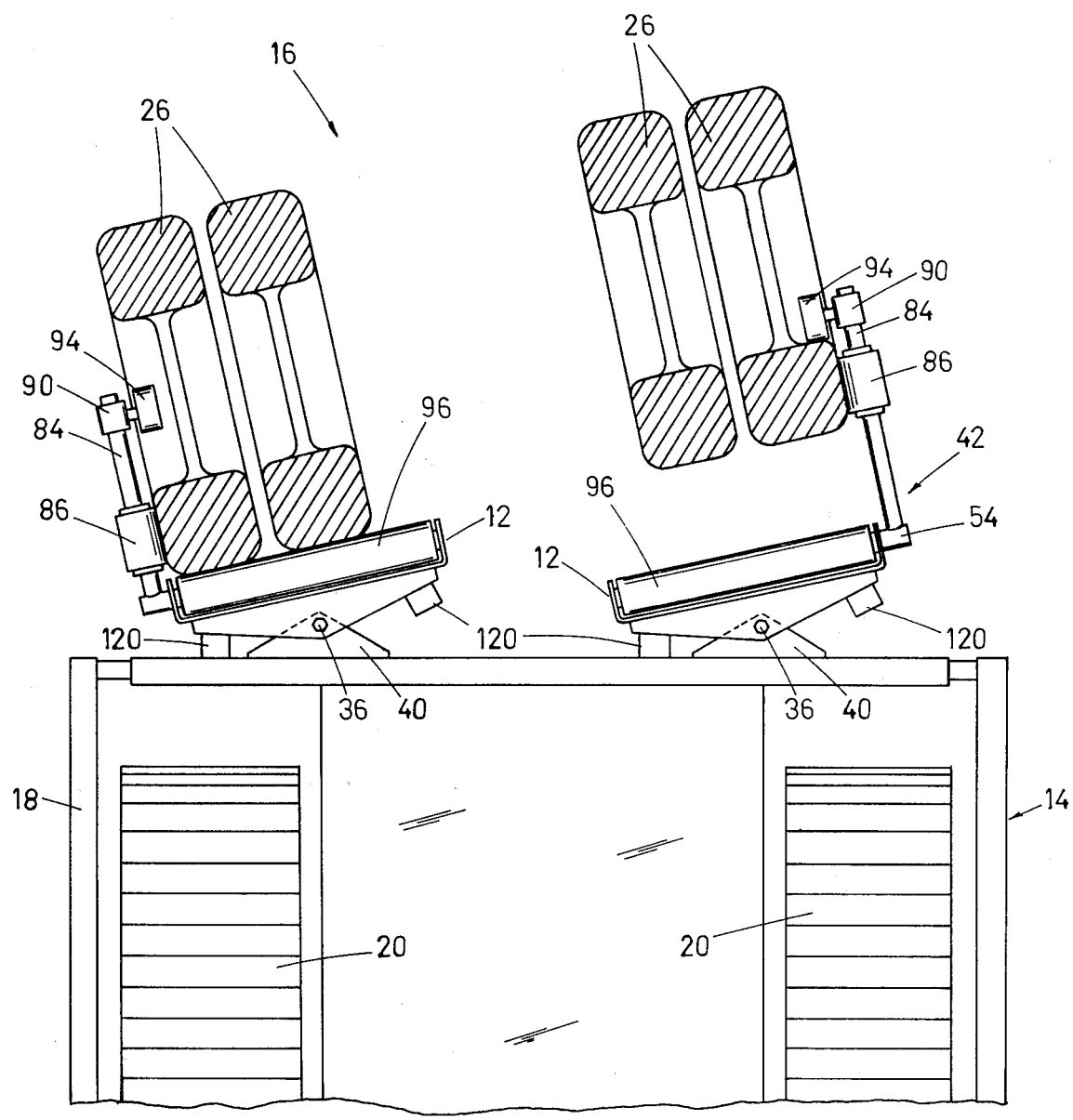

One embodiment of the present invention will now be described, by way of example, with reference to the accompanying drawings, of which:

FIG. 1 is a plan view of connecting apparatus mounted on a paving machine and coupled to a supply truck, FIG. 2 is a diagramatical side view of the paving machine, supply truck and connecting apparatus, FIG. 3 is a sectional view, partly in elevation, of the connecting apparatus taken along the line 3—3 of FIG. 2, FIG. 4 is a sectional view of the connecting apparatus taken along the line 4—4 of FIG. 3, FIG. 5 is a diagram of the hydraulic circuit of the connecting apparatus, FIG. 6 is a plan view similar to FIG. 1, but showing the manner in which the connecting apparatus functions when the paving machine and supply truck are negotiating a left hand curve, and FIG. 7 is a plan view of connecting apparatus similar to that shown in FIG. 1 with the paving machine and supply truck mis-aligned.

Referring to the drawings, connecting apparatus 12 effects a driving connection between a paving machine 14, which acts as a pushing vehicle, and a supply truck 16. Since the paving machine 14 and supply truck 16 are known per se, they will only be briefly described.

The paving machine 14, (only the front portion thereof being shown) has a chassis 18 mounted on caterpillar track 20. The paving machine 14 is self-propelled, and is steered by its tracks 20. The chassis 18 carries a hopper 22, from which paving material is fed onto the surface to be paved and levelled thereon, by parts of the paving machine (not shown) which may be of any suitable known kind. The supply truck 16, (whereof only the rear portion is shown) has a chassis 24 with a pair of rear wheels 26 at each side. The chassis 24 carries a tip-up body 28, which can be tilted in known manner as shown in FIG. 2, to cause supplies of paving material in the truck body 28 to be dropped into the hopper 22 of the paving machine 14. The rear wheels 26 of the truck 16 have broad overhanging rims 30 as best shown in FIG. 1.

The connecting apparatus 12 includes a pair of pushers 32 attached to the leading end of the paving machine 14, one pusher 32 being on the left hand side, and the other pusher 32 being on the right hand side. The construction of the two pushers 32 is identical, except that they are mirror images of one another, since one is a left hand unit and the other is a right hand unit. For convenience therefore, only one pusher 32 will be described.

Each pusher 32 includes a frame 34 pivotally attached to the leading end of the paving machine 14 for left and right swinging thereon about a vertical axis independently of the frame 34 of the other pusher 32. The pivotal attachment is provided by a pin 36 which passes through horizontal flanges 38, 40 on the frame 34 and the front end of the chassis 18 respectively.

A coupler 42 (FIGS. 1 and 4) is slidably carried by frame 34 to permit lateral sliding movement substantially horizontally and transversely of the paving machine 14. The frame 34 includes a forwardly-facing U-shaped bracket 44, which has a rear plate 46 and a pair of side-arms 48 extending forwardly one at each end. The flange 38 extends rearwardly from the plate 46. A fixed hollow sleeve 50, defines a cylinder 52 and is supported at each end in apertures in arms 48. A bar 54 is slidably mounted, with one end of the bar 54 extending laterally beyond the recess 52 as best shown at the left hand side of FIG. 4.

A pair of transversely-spaced lugs 56 and 56' extend rearwardly and downwardly from the rear wall 46 of the bracket 44. The outer lug 56 is aligned with the outer side wall 48 of bracket 44, but the inner lug 56' is spaced from the other side wall 48. A fixed tube 58 extends from the inner lug 56' through an aperture in the outer lug 56 so as to project slightly beyond the outer lug 56. A rod 64 is slidably mounted in tube 58, and one end of the rod 64 projects beyond the outer end of tube 58.

The projecting ends of the rods 54 and 64, are connected to a side plate 66 so that the bars 54 and 64, slide in unison in their tubes 50 and 58. The outer end portion of sleeve 58 which projects beyond the outer lug 56, acts as a stop to limit lateral inward movement of the rods 54 and 64. The connection of rod 54 to side plate 66 is such that it is rotatable relative thereto, for a reason which will appear later.

A hydraulic jack 68 (FIG. 5) extends parallel to the bars 54 and 64, and has a cylinder 70 with its inner end connected to the inner lug 56' and its outer end mounted in and extending through the outer lug 56. Piston 72 of cylinder 70 is connected to the side plate 66. Cylinder 70 and piston 72 are both pivotally mounted at their free ends by lugs 74, 76 and pin 78, and lug 80 and pin 82, respectively.

The coupler 42 includes a forwardly extending coupler arm 84 which is connected to the rod 54 adjacent side plate 66. An elongated side roller 86 is rotatably and slidably mounted on the coupler arm 84 intermediate its length. The free end of coupler arm 84, remote from the frame 34, has a projection 88 extending laterally inwardly of the arm 84. A short sleeve 90 is slidably mounted on the coupler arm 84. A shaft 92 extends laterally inwardly from the short sleeve 90, and a short roller 94 is rotatably mounted on the shaft 92. The position of the short sleeve 90 on the coupler arm 84 is adjustable. The coupler arm 84 is provided with a series of apertures 91 through which a sleeve securing bolt 93 can be selectively secured.

The tube 50 which extends between the sidewalls 48 of the bracket 44, besides supporting and guiding rod 54 also serves as a bearing for an elongated roller 96 mounted on the sleeve 50 between the bracket sidewalls 48. The diameter of the roller 96 is such that it projects beyond the front ends of the bracket sidewalls 48.

FIG. 5 shows the hydraulic circuit for controlling the jacks 68 of the pushers 32. Both jacks 68 are double-acting, that is to say, they can be extended or contracted by application of fluid pressure to the respective sides of the pistons. A hydraulic pump 100 is driven by a motor 102 and is supplied with hydraulic fluid from a reservoir 104. The pump, motor and reservoir being mounted on the paving machine 14. An electrically-operated hydraulic control valve 106 attached to the pump 100 has three positions which can be selected by a switch 108 mounted on the paving machine control panel and connected to the control valve 106 by leads 110.

In one position of the switch 108, the control valve 106 causes the pump 100 to pump fluid from the reservoir along a line 112, which splits into two lines 114 connected to the "expanding" ends of the cylinders 70 of the respective jacks 68, that is to say to the ends of the cylinders 70 into which the supply of fluid under pressure causes the jacks 68 to expand by pushing the piston rods 72 outwardly of the respective cylinders 70. Such movement causes lateral outward movement of the coupler arms 84 away from one another, as indicated in dotted outline in FIG. 1. In this position of the switch 108, fluid from the opposite or "contracting" ends of the cylinders 70 returns from the cylinder 70 along line 116 and line 118 to the control valve 106, which directs the returning fluid to the reservoir 104.

In the second position of the switch 108, the control valve 106 causes the pump 100 to pump fluid along lines 118 and 116 to the contracting ends of the cylinder 70, so that the piston rods 72 are retracted into the cylinder 70 thus causing lateral inward movement of the coupler arms 84 towards one another, as shown in solid lines in FIG. 1. The control valve 106 also permits fluid from the expanding ends of the cylinders to return to the reservoir.

In the third position of the switch 108, the control valve 106 shuts off both lines 112 and 118. In this condition, the expanding ends of the cylinder 70 are connected to one another by lines 114, and the contracting ends of the cylinder 70 are connected together by lines 116. Thus, extension of one jack 68 by an external force will result in contraction of the other jack 68. In other words, if the coupler arm 84 of one pusher 32 moves laterally inwardly under the action of an external force, the coupler arm 84 of the other pusher 34 will move laterally outwardly, i.e., both the coupler arms 84 move laterally in the same direction.

In use of the connecting apparatus, the paving machine 14 is suitably positioned for receiving the supply truck 16 in front of it, and the switch 108 is operated to move the coupler arms 84 to their laterally outermost positions as indicated in dotted outline in FIG. 1. The supply truck 16 is then reversed into position in front of the paving machine 14, so that the rear wheels 26 of the supply truck 16 pass between the coupler arms 84 until the rear wheels 26 engage the rollers 96, the pair of wheels 26 on one side of the truck 16 engaging the roller 96 of one pusher 32 and the pair of wheels 26 on the other side of the truck 16 engaging the roller 96 of the other pusher 32, as shown in FIG. 1.

The switch 108 is then operated to move the coupler arms 84 laterally inwardly until the side rollers 86 on the coupler arms 84 engage the side walls of the respective laterally outermost wheels 26. In this position of the coupler arms 84, shown in full lines in FIG. 1, the laterally-projecting rollers 94 on the ends of the coupler arms 84 are in overlapping relation with the rims 30 of the wheels 26. The switch 108 is then moved to its third position so as to connect the respective ends of the cylinder 70 together, as previously described.

The body 28 of the truck 16 is then tilted, as shown in FIG. 2, to cause paving material to fall from the truck body 28 into the hopper 22 of the paving machine 14. The paving machine 14 is then operated in known manner to pave the required surface.

During the paving operation, the paving machine 14 pushes the supply truck 16 forwardly by reason of the engagement of the rollers 96 of the pushers 34 with the tires of the rear wheels 26 of the truck 16. The pushers 32 thus provide a bumper formation on the leading end of the paving machine 14. Any forward movement of the truck 16 relative to the paving machine 14 is limited by engagement of the wheel rims 30 of the truck 16 with the laterally-projecting rollers 94 on the free ends of the coupler arms 84. In this condition, the connecting apparatus transmits a pulling force from the truck 16 to the paving machine 14. The amount of such permitted movement can be controlled by adjusting the positions of the sleeves 90 on the coupler arms 84 to adjust the effective length of arms 84 between respective rollers 94 and rollers 96 as required. Obviously the effective length of each arm 84 between respective roller 94 and pusher roller 96 is dimensioned to be somewhat less than the combined dimensions of the diameter of the chamber defined by wheel rim 30 and the thickness of the tire between its circumference and said chamber, affording roller 94 maximum scope of movement within said chamber without frustrating engagement of pusher roller 96 with the wheel 26.

When the paving machine 14, and hence the truck 16, have to be steered around a curve, the frame 34 of each pusher 32 can swing about its vertical axis independently of the other frame 34, as shown in FIG. 6. In the condition illustrated in FIG. 7, the driver of the truck 16, who merely steers the truck, has turned it to the left. This results in the wheels 26 on the right hand side of truck 16 moving forwardly relative to the paving machine 14, out of contact with the pusher roller 96 on the right hand pusher 32 and into contact with the laterally-projecting roller 94 on that side. At the same time, each frame 34 has swung to the left to accommodate the articulation between the truck 16 and the paving machine 14.

Since each pusher 32 is short relative to the width of the paving machine 14, the pusher frames 34 can swing through relatively large angles with the result that the connecting apparatus can accommodate relatively large amounts of articulation between the truck 16 and the paving machine 14. Also, since the pusher frames 34 are independent of one another, they do not have to swing through exactly the same angle, and thus can better accommodate themselves to the positions of the rear wheels 26 of the truck 16. Steel stops 120 are mounted on the rear side of the rear walls 46 of the brackets 44 to prevent the pusher frames 34 from actually engaging the front end of the chassis 18 of the paving machine 14. Also, the flanges 38, 40 may be fitted with appropriate stops 122, 124 respectively.

If, while turning a curve in the manner indicated in FIG. 7, the truck 16 tends to move to the right relative to the paving machine 14, the coupler arm 84 of the right hand pusher 32 will be pushed laterally outwardly. Since, during a paving operation, the switch 108 is positioned to cause the respective ends of the cylinders 70 to be interconnected, the coupler arm 84 of the left hand pusher 32 will be pulled laterally inwardly, thus maintaining the left hand pusher 32 in engagement with the tower of the laterally outer rear wheel 26 on the left hand side.

During this turning motion and lateral movement the rollers 86 remain in engagement with the adjacent sidewall of the tire and slide down arms 84 as shown in opposing directions in response to the turning of the wheels; a corresponding turn in the opposite direction brings about an opposite response.

After the paving operation is finished, the truck 16 can be released from the paving machine 14 by operation of the switch 108 to cause the coupler arms 84 to move laterally outwardly. The truck 16 can then be driven away. When the paving machine 14 is not in use, the coupler arms 84 are returned to their laterally inner positions. Also, since the bars 54, on which the coupler arms 84 are mounted, are rotatable, the coupler arms 84 can be moved angularly upwardly from their horizontal operative positions into upper inoperative positions, where they are less likely to be damaged by other equipment.

The sleeve securing bolts 93 are designed as shear pins which fracture if the truck driver should inadvertently pull away from the paving machine while the sample arms 84 are in operative relationship with the truck wheels. If this does happen, the sleeves 90 merely slide off the coupler arms 84, thereby avoiding further damage to the pushers 32.

Various modifications to the described embodiment, within the scope of the invention, will be apparent to the man skilled in the art, the scope of the invention being defined in the appended claims.

What I claim is:

1. Apparatus for effecting a driving connection between a pushing vehicle and a pushed vehicle having broad overhanging wheel rims defining outwardly facing wheel rim chambers, said apparatus comprising;
- a pair of sort pushers attachable to and providing bumper formations on the leading end of the said pushing vehicle, said pushers being spaced apart for respective pushing engagement with the wheels on the corresponding sides of said pushed vehicle,
- each said pusher including an individual frame pivotally and closely attachable to the leading end of the said pushing vehicle for left and right deflection about a vertical axis for alignment with the wheel engaged thereby independently of the alignment of the other pusher,
- a coupler slidably carried by said frame for reciprocable sliding movement in a substantially horizontal direction transversely of said pushing vehicle,
- an arm forming part of said coupler having a free end normally extending forwardly of said frame,
- a lateral projection on said free end extending transversely of said pushing vehicle and spaced from said frame to enable said lateral projection to be positioned, by said sliding movement of said coupler, within said wheel rim chamber of said pushed vehicle for transmission of a pulling force from said pushed vehicle to said pushing vehicle and means for laterally moving said coupler into and out of said wheel rim chamber; the effective length of the arm being somewhat less than the combined dimensions of the diameter of the wheel rim chamber and the thickness of the tire between its circumference and said chamber affording substantial displacement of the lateral projection therein.

2. Apparatus according to claim 1 wherein the frame of each pusher has a pair of spaced, parallel, transversely-elongated recesses, and the coupler includes a corresponding pair of spaced, parallel bars slidably mounted in the recesses and connected together for movement in unison.

3. Apparatus according to claim 2 wherein the coupler arm of each pusher extends from one of said bars thereof.

4. Apparatus according to claim 3 wherein each coupler arm is angularly movable about the longitudinal axis of said one bar between operative and inoperative positions.

5. Apparatus according to claim 2 wherein the frame of each pusher includes a transversely-extending sleeve whose interior forms one of said recesses, and a roller engagable with said pushed vehicle to transmit a pushing force thereto as aforesaid is rotatably mounted on said sleeve.

6. Apparatus according to claim 1 wherein said means for effecting said sliding movement includes a fluid-pressure-operated piston-cylinder jack connected between the frame and the coupler.

7. Apparatus according to claim 6 includes means for making a fluid coupling between the jack of one pusher and the jack of the other pusher, during a paving operation, to cause sliding movement of the coupler arm of one pusher to be accompanied by corresponding sliding movement of the coupler arm of the other pusher in the same direction.

* * * * *